(No Model.)
W. L. STEWART.
BRAKE FOR BICYCLES, &c.
No. 550,851. Patented Dec. 3, 1895.
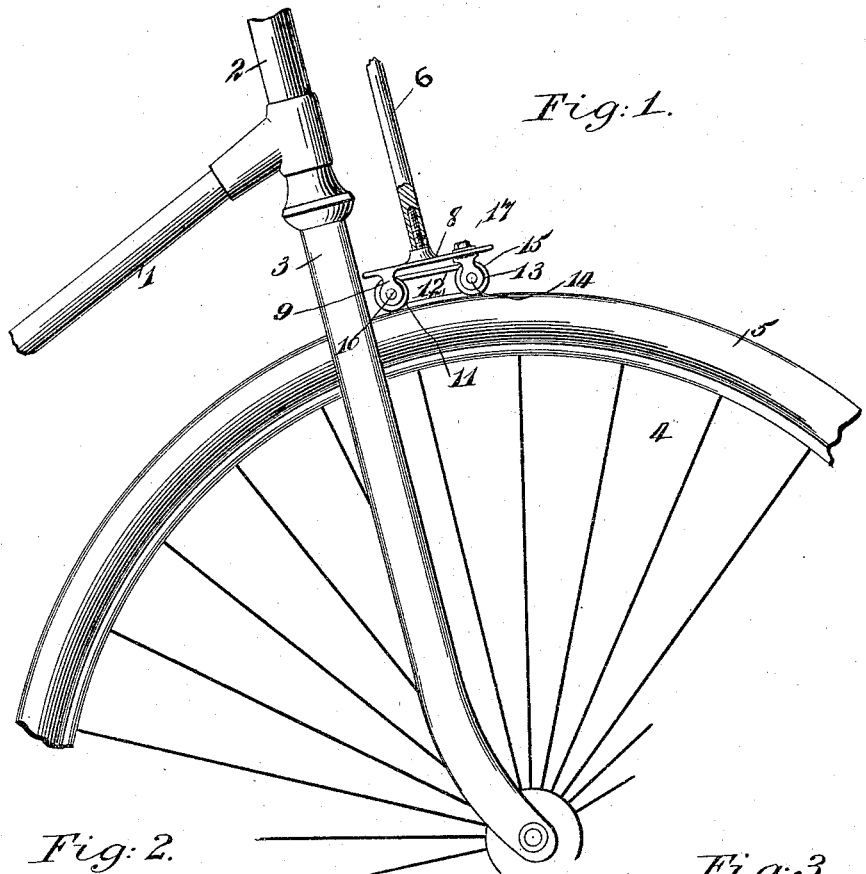
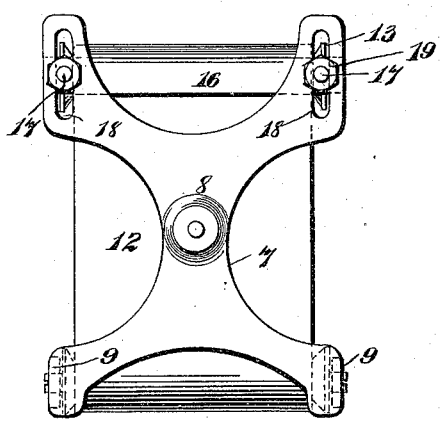
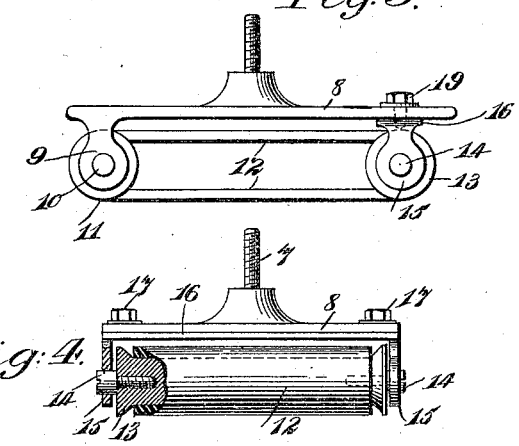
WITNESSES:
John A. Rennie
J. H. Caplinger
INVENTOR
W. L. Stewart
BY Munn & Co
ATTORNEYS.

UNITED STATES PATENT OFFICE.

WILLIAM L. STEWART, OF WILMERDING, PENNSYLVANIA.

BRAKE FOR BICYCLES, &c.

SPECIFICATION forming part of Letters Patent No. 550,851, dated December 3, 1895.

Application filed August 6, 1895. Serial No. 558,419. (No model.)

*To all whom it may concern:*

Be it known that I, WILLIAM L. STEWART, of Wilmerding, in the county of Allegheny and State of Pennsylvania, have invented certain new and useful Improvements in Brakes for Bicycles and the Like, of which the following is a full, clear, and exact description.

This invention relates to certain improvements in brakes such as are employed on bicycles and similar vehicles, and has for its object to provide a brake of this character of a novel and inexpensive construction, which shall be readily adjustable for taking up wear after being placed in use, and which shall be adapted to be operated either by hand or foot to stop the vehicle.

The invention consists of a frame adapted to be moved toward or from the wheel-tire, two rollers carried on said frame, and a flexible band carried on and arranged to turn around said rollers and adapted to engage the tire of the vehicle-wheel when the frame is moved toward said tire.

The invention also contemplates certain novel features of the construction, combination, and arrangement of the various parts of the improved brake, whereby certain important advantages are attained and the device is made simpler and otherwise more convenient and better adapted for use than other forms of brake heretofore employed, all as will be hereinafter fully set forth.

The novel features of the invention will be carefully defined in the claims.

Figure 1 is a general view showing portions of the frame and front wheel of a bicycle having my improved brake arranged thereon in position for use. Fig. 2 is a plan view of the brake-frame detached. Fig. 3 is a side view of the same; and Fig. 4 is an end view of the frame, one of the rollers thereon being shown in section at one end to better illustrate its construction.

In the views, 1 represents the frame of the bicycle or other vehicle to which the brake is shown applied, and 2 represents the steering-head, 3 the front fork, and 4 the front wheel having a tire 5 to be engaged by the brake herein shown as attached to the lower end of the stem 6 and adapted to be operated by hand, being provided on its upper part with a screw-threaded shank or stud 7 to engage a screw-threaded socket in the lower end of said stem 6.

The frame of the brake consists of a flat metal plate 8 of the form shown in Fig. 2, having on its upper side the aforesaid projecting stud 7 to screw into the socket in stem 6, and at the opposite sides of its rear part the said frame is provided with ears or lugs 9 depending from its under side at right angles and provided with aligned perforations forming bearings wherein is rotatively mounted a roller 11, having journals or trunnions formed of screws 10 inserted in its ends and having enlarged heads engaging said bearings, as will be readily understood. The roller 11 is provided at its ends with projecting flanges, and over its central part between said flanges passes an endless band or belt 12, of somewhat elastic material—as rubber fabric, for example—the other end of which extends over a similar flanged roller 13, having screws 14 in its ends and provided with enlarged heads engaging aligned apertures formed in lugs or ears 15 depending from opposite ends of a bracket 16, secured to the under side of the frame 8 at the end thereof opposite to said roller 11. The bracket 16 and the roller 13 carried therein are mounted adjustably, the bracket being provided with threaded studs 17 at its ends, which studs project upward through slots 18, formed in the opposite sides of the frame 8 at the end thereof opposite the roller 11, and receive nuts 19, whereby the said bracket 16 may be securely clamped in place on said frame.

In operation, when the brake stem or rod 6 is forced downward in the usual way, the brake-frame is also forced downward so as to cause the band or belt 12 to bear with more or less pressure on the wheel-tire 5, so as to stop the same from turning, and if in use the band 12 should stretch so as to become too loose its slack may be taken up by loosening the nuts 19 and moving the bracket 16 and roller 13 carried thereby forward to the necessary extent.

From the above description of my improved brake it will be seen that the device is of an extremely simple and inexpensive construction and is especially well adapted for use on wheels having pneumatic tires, for the reason that the band or belt 12 moves with the tire and does not bear on the same in such a way as to cut or wear the material of which the tire is made, as is the case with other forms of brake heretofore devised. Furthermore, it is adapted to be readily and conveniently adjusted to take up looseness resulting from wear or any reason, so that it is not liable to become deranged or inoperative. It will also be evident from the above description of my improvements that the device is susceptible of considerable modification without material departure from the principles and spirit of my invention, and for this reason I do not wish to be understood as limiting myself to the precise embodiment of the brake herein shown. For example, by very slight modification the brake may be adapted for use as a foot-brake.

Having thus described my invention, I claim as new and desire to secure by Letters Patent—

1. A brake for bicycles and the like, comprising a frame, rollers mounted to turn therein, and an endless band carried on said rollers and adapted to engage the wheel tire, substantially as set forth.

2. A brake for bicycles and the like, comprising a frame, rollers mounted to turn therein, one of said rollers being provided with means for adjusting it toward and from the other, and an endless band carried on said rollers and adapted to engage the wheel tire, substantially as set forth.

3. A brake for bicycles and the like, comprising a frame, a roller mounted to turn thereon, a bracket adjustably mounted on the frame, a roller mounted to turn in the bracket, and an endless band carried on said roller and adapted to engage the wheel tire, substantially as set forth.

4. A brake for bicycles and the like, comprising a slotted frame, a roller mounted to turn thereon, a bracket having screw threaded projections engaging the slots in the frame, nuts engaging said projections, a roller mounted to turn in said bracket, and an endless band carried on said rollers and arranged to engage the wheel tire, substantially as set forth.

WILLIAM L. STEWART.

Witnesses:
F. L. STEWART,
W. L. HANKEY.